United States Patent
Yung Chu et al.

[11] Patent Number: 5,236,721
[45] Date of Patent: * Aug. 17, 1993

[54] SUSTAINED FLAVORANT RELEASE COMPOSITION, CHEWABLE STRUCTURE INCORPORATING SAME AND METHOD FOR MAKING SAME

[75] Inventors: Anita W. Yung Chu; Joseph R. Robinson, both of Madison, Wis.

[73] Assignee: Columbia Laboratories, Inc., Hollywood, Fla.

[*] Notice: The portion of the term of this patent subsequent to Feb. 12, 2008 has been disclaimed.

[21] Appl. No.: 836,058

[22] Filed: Feb. 12, 1992

[51] Int. Cl.⁵ .............................................. A23G 3/30
[52] U.S. Cl. ........................................ 426/5; 426/534; 426/651; 426/302
[58] Field of Search .................................. 426/3-6, 426/96, 98, 534, 651, 302

[56] References Cited

U.S. PATENT DOCUMENTS

| | | | |
|---|---|---|---|
| 2,973,273 | 2/1961 | Curtiss | 426/5 |
| 3,071,476 | 1/1963 | Werft et al. | 426/132 |
| 3,795,744 | 3/1974 | Ogawa et al. | 426/3 |
| 3,826,847 | 7/1974 | Ogawa et al. | 426/3 |
| 4,933,189 | 6/1990 | Cherukuri et al. | 426/5 |
| 4,992,280 | 2/1991 | Yung Chu | 426/5 |
| 5,139,798 | 8/1992 | Yatka | 426/5 |

Primary Examiner—Jeanette Hunter
Attorney, Agent, or Firm—Weil, Gotshal & Manges

[57] ABSTRACT

A sustained flavorant release composition is provided for use in a chewable structure. The flavorant release composition comprises a continuous film of a homogenous dispersion of a liquid flavorant agent and polyvinyl acetate, in a weight ratio of the liquid flavorant agent to polyvinyl acetate of about 1:5 to about 5:1, respectively. A method of producing the flavorant release composition is also provided and includes admixing the polyvinyl acetate, which is dissolved is a volatile, nonreactive organic solvent, with the flavorant release agent at a temperature at which the flavorant release agent does not degrade, followed by solvent removal. The chewable structure includes the continuous film of the flavorant release composition and a gum base composition.

42 Claims, 1 Drawing Sheet

SUSTAINED FLAVORANT RELEASE COMPOSITION, CHEWABLE STRUCTURE INCORPORATING SAME AND METHOD FOR MAKING SAME

DESCRIPTION

1. Technical Field

This invention relates to a sustained flavorant release composition, a method for making it, and a chewable structure incorporating it.

2. Background of the Invention

Chewing gum compositions conventionally include a water-insoluble gum base composition having distributed therein artificial sweeteners, e.g., aspartame or hydrophobic sweeteners, and a flavorant agent. A major deficiency in currently available chewing gums is exhaustion of the sweetness and flavor sensations in a relatively short time period after onset of mastication. This exhaustion usually occurs in a time period of less than ten minutes.

In an attempt to increase this time period, some techniques for encapsulation and resulting sustained release of the sweetener and flavorant agent have been developed. For example, U.S. Pat. No. 4,590,075 to Wei et al. provides examples of methods of encapsulation in an attempt to increase the duration of sweetness and flavor sensation. These methods include encapsulating, in granular form, sweetener and flavorant agents in water insoluble compounds.

An effective encapsulating composition for a chewing gum should simultaneously protect an active ingredient from moisture degradation while providing controllable release thereof. For example, U.S. Pat. No. 3,826,847 and U.S. Pat. No. 3,795,744, both to Ogawa et al., disclose polyvinyl acetate (PVAC) having a polymerization degree of 200 to 1500 (i.e., a number average molecular weight of 17,200 to 129,000 daltons) for use in encapsulating a flavorant agent.

U.S. Pat. No. 4,515,769 to Merritt et al. provides placing a flavorant agent in a hydrophilic matrix material, which, in its dry particulate form, is encapsulated within a water insoluble material, such as PVAC. It is envisioned that the flavor will be released only upon the puncture of the water insoluble material. Thus, it is envisioned that the PVAC does not allow the passage of flavor.

U.S. Pat. No. 4,711,784 and related U.S. Pat. No. 4,740,376 to Yang teach that high molecular weight PVAC is not useful as a chewing gum flavorant encapsulating agent without combining such PVAC with a plasticizer, such as a glyceride, which is not a flavorant agent. A high molecular weight PVAC was defined as having a molecular weight of greater than 20,000 daltons, as determined by gel permeation chromatography. Yang also teaches that granules of encapasulating agent containing a flavorant agent are added to a gum base composition at elevated temperatures, usually associated with gum preparation, such as 45 to 55 degrees C.

Moreover, U.S. Pat. No. 4,386,106 to Merritt et al. teaches that use of PVAC as an encapsulating agent is undesirable because a substantial amount of flavor becomes "fixed" therein. In other words, the flavors are retained within the PVAC, which prevents proper release of flavor. The '106 patent also teaches that a cross-linking agent or continuous gum arabic or gelatin film is required in a chewing gum when spearmint oil or cinnamic aldehyde is utilized as a flavorant with PVAC because these flavors are good solvents for PVAC.

U.S. Pat. No. 4,816,265 to Cherukuri et al. discloses PVAC having a molecular weight from about 2,000 to about 14,000 daltons, containing an emulsifier, that may be used encapsulating sweeteners, for effecting controlled release of the sweetener. The invention is particularly directed toward the use of such a composition with crystalline sweeteners, which are difficult to wet.

The present inventors' prior U.S. Pat. No. 4,992,280 teaches the use of PVAC having a number average molecular weight of about 150,000 to 200,000 daltons, with a liquid flavorant dispersed therein in a weight ratio of 1:5 to about 5:1, respectively, as a flavorant release composition that is substantially free of plasticizer. For preparation of a chewing gum, the flavorant composition may be chopped into or otherwise incorporated into a gum base composition.

U.S. Pat. No. 4,933,189 to Cherukuri et al. teaches a chewing gum comprising a gum base, a flavoring agent and two types of sweeteners. The gum base is taught as being discontinuous due to the presence of a bulky sweetener.

Sustained release of a flavorant agent for a time period in excess of one hour after onset of mastication is desirable in a chewable gum. It would also be desirable to prepare such a chewing gum from a simplified composition that does not require cross-linking agents or films to separate the chewing gum components or a plasticizing agent distinct from the flavorant agent.

SUMMARY OF THE INVENTION

The present invention provides a sustained flavorant release composition suitable for providing sustained release of a flavorant, and optionally a sweetener, from a chewable structure during mastication. The flavorant release composition comprises a continuous film of a homogenous dispersion of a liquid flavorant agent and polyvinyl acetate (PVAC). The weight ratio of the liquid flavorant agent to the PVAC is about 1:5 to about 5:1, respectively.

The flavorant release composition may not require a separate plasticizing agent that is distinct from the liquid flavorant agent. That is, the liquid flavorant agent itself may perform both the functions of the flavorant and the plasticizing agent in conventional systems. However, under certain The flavorant release composition optionally includes a sweetening agent that, upon mastication, is also released over an extended period of time.

The sustained flavorant release composition can be shaped into a continuous flavor-releasing element and used in a chewable structure. One such structure comprises at least one flavor releasing element and a gum stock element composed of a gum base composition. The weight ratio of the gum base composition to the total weight of all of the flavorant release composition utilized is preferably about 20:1 to about 4:1, respectively.

The present invention also contemplates a method of producing the sustained flavorant release composition. This method comprises the steps of admixing the PVAC, that has been dissolved in a volatile, nonreactive organic solvent, with the liquid flavorant agent in a weight ratio of liquid flavorant agent to PVAC of about 1:5 to about 5:1, respectively, and removing the solvent to produce a continuous film of the sustained flavorant release composition. The organic solvent is substantially non-reactive with the sustained flavorant release composition and constituents thereof. Admixing is carried out at a temperature at which there is substantially no degradation of the liquid flavorant agent, minimal evaporative loss of volatile components and at which the admixture is deformable.

The present invention can be utilized to keep separate the components in the flavorant release composition from components in the gum stock composition until mastication. This separation of components is desirable when the components are incompatible, as, for example, when contact between the components would result in degradation of either composition over time, a change in flavor sensation provided by the flavorant agent over time, or the like.

Numerous advantages and features of the present invention will become readily apparent from the following description of the preferred embodiments, the accompanying drawings, and the appended claims.

DETAILED DESCRIPTION OF THE INVENTION

Figure 1:
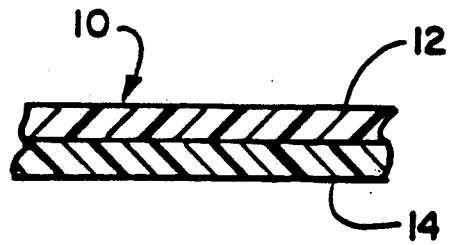
FIG. 1 is a greatly enlarged, fragmentary, longitudinal cross-sectional view of a chewable structure embodying the present invention that includes a single continuous film of sustained flavor release composition and a gum base composition.

Although this invention is susceptible to embodiments in many different forms, only certain preferred embodiments of the invention are shown. It should be understood, however, that the present disclosure is to be considered as an exemplification of the principles of this invention and is not intended to limit the scope of the invention to the embodiments specifically disclosed and illustrated.

In one aspect, the invention provides a continuous film of a sustained flavorant release composition suitable for providing sustained release of a flavorant agent and, optionally, a sweetener, in a chewable structure during mastication. The sustained flavorant release composition comprises a continuous film of a dispersion of a liquid flavorant agent and polyvinyl acetate (PVAC). The weight ratio of the liquid flavorant agent to the PVAC is about 1:5 to about 5:1, respectively.

The rate of release of the flavorant agent produced upon mastication can be varied by varying the amount of the PVAC utilized. The average molecular weight of the PVAC utilized does not change the rate of release of the flavorant. Furthermore, the flavorant release composition need not contain a separate plasticizing agent that is distinct from the liquid flavorant agent. That is, the flavorant agent itself may function as a plasticizing agent, in addition to its function of providing flavor. However, under certain conditions, it may be desirable to add a separate plasticizing agent to the flavorant release composition.

The molecular weight of the PVAC used to make the flavorant composition does not affect the release rate of flavorants or sweeteners. The Food and Drug Administration (FDA), however, has set a limit of 2,000 daltons as a minimum molecular weight of PVAC for human consumption. See 21 CFR § 172.615 (1990). Thus, PVAC having a number average molecular weight of about 2,000 daltons, is the minimum molecular weight PVAC that may be used in the present invention.

The maximum molecular weight PVAC to be used in the present invention is determined by the physical characteristics of high molecular weight PVAC. This is because PVAC becomes stiffer and more difficult to chew as the molecular weight of PVAC increases. This stiffness may be mitigated or modulated by the use of plasticizers or flavoring agents that function as plasticizers. At a certain point, however, the stiffness modulation no longer is feasible, because too much plasticizer is required to soften the PVAC. Thus, the number average maximum molecular weight PVAC for use in the present invention is about 500,000 daltons. Preferably, for use in the present invention, the PVAC has a number average molecular weight of between about 80,000 and about 200,000 daltons.

The amount of plasticizing agent used varies with the molecular weight of the polymer. As the molecular weight of the PVAC used in preparing the composition is increased, the amount of plasticizing agent, or of flavoring agent, if the flavoring agent is the plasticizing agent, must also be increased. The exact amounts of plasticizing agent required to produce an acceptable product vary, since, it is well known in the polymer art, that plasticizing agents are added at different weight amounts for different uses. Thus, the softer the film desired, the more plasticizing agent is required.

The sustained flavorant release composition of the present invention, discussed in more detail hereinafter, is suitable for use in any chewable structure that is comestible or in any chewable product that is not normally swallowed, such as chewing gum.

One such chewable structure is illustrated in FIG. 1 and is designated generally therein by the reference numeral 10 The structure 10 includes a continuous film of sustained flavor release composition, designated by reference numeral 12 attached to, carried by, or otherwise associated with a gum base composition designated by reference numeral 14, such that the two components of the structure are juxtaposed, but distinct, phases.

The structure designated as reference numeral 12 includes at least the above-described flavorant release composition and is initially provided in a selected, suitable, continuous shape so as to define, along with the gum base composition 14, the structure 10.

The structure designated as reference numeral 14 is a conventional gum base composition formed into the desired shape. Suitable gum base compositions include conventional chewing gum base compositions, including bubble gum base compositions.

A typical gum base composition comprises polyvinyl acetate of a lower molecular weight, polyvinyl propionate, ethyl cellulose, chicle, jelutong or ester gum alone, or in a mixture blended with a plasticizer, such as dibutylphthalate, butylphthalyl butyl glycolate, methylacetylcyanate or the like, together with other additives, such as calcium carbonate, talc, wax, polyisobutylene and/or polybutylene that act to plasticize the blend as well as to modulate the hardness, the viscoelasticity and the formability of the gum base composition. The gum base composition can also include known gum additives, including inter alia, sweeteners, salts, acidifying agents, other spices, and colorants. Furthermore, the gum base composition can be a commercially available chewing gum having flavor.

Illustrative gum base compositions include those commercially available from L. A. Dreyfuss Co., South Plainfield, N.J., TRIDENT® gum commercially available from Warner-Lambert and various chewing gums commercially available from the Wrigley Co., Chicago, Ill.

The sustained flavorant release composition comprises a continuous film of PVAC and a liquid flavorant agent. As used herein, a continuous film is a film that is present as a continuous phase. That is, in any chewable structure within the scope of the invention the continuous film may be a laminate, block, globule, etc. In accordance with the present invention, however, the film may not be present in the chewable structure as a discontinuous, or disperse phase. That is, the film may not be chopped up or otherwise fragmented and dispersed as pieces within the gum stock portion of the chewable structure.

The PVAC encapsulates the liquid flavorant agent. The term "encapsulate", as used herein in its various grammatical forms, defines the microscopic relationship of the PVAC enclosing the liquid flavorant agent.

The liquid flavorant agent is a natural, modified or synthetic flavorant agent that provides a sensation of flavor in the buccal cavity upon mastication of the flavorant release composition. Thus, by recitation of a flavorant agent, a flavor-producing amount of the flavorant agent is present. A single flavorant agent can be used in the flavorant composition as well as a mixture of two or more flavorant agents. Regardless of whether one or more specific, identifiable flavorant agents is used, the flavorant agent is considered herein, as a single entity unless specific components are mentioned.

Although the flavorant agent of the invention is a liquid at temperatures usually encountered, such as zero to 100 degrees C., and functions to provide the flavor, this liquid flavorant agent may also function as a plasticizing agent. This dual function eliminates the need for a separate plasticizing agent (i.e., one that is not also a flavorant agent). Thus, the present flavorant release composition may be substantially free of a plasticizing agent distinct from the liquid flavorant agent.

A non-exclusive list of illustrative liquid flavorant agents, that can function both as a plasticizing agent and provide a sensation of flavor during mastication, includes spearmint oil, cinnamon oil, oil of wintergreen, peppermint oil, lemon oil, orange oil, grape oil, lime oil, tangerine oil, grapefruit oil, apple essence, strawberry essence, cherry essence, pineapple essence, peach essence, raspberry essence, mixtures thereof and the like. See Furia, *Handbook of Food Additives* 2nd, CRC Press, Cleveland, Ohio, pp. 475–511, for additional flavorant agents and common chemical components and flavor characteristics thereof.

Concentrated flavoring oils, including folded oils and essence, can also be utilized.

Essence can be obtained from fruit extracts. Alternatively, the flavor strength of the extract can be reinforced by combining 51 weight percent of the basic extract with 49 weight percent of a combination of other natural flavorings to increase the flavor strength. Such an extract is commonly referred to as a With Other Natural Flavors (WONF) extract. See, *Handbook of Food Additives*, at p. 468. These WONF extracts are also suitable for use in the present invention.

Exemplary flavorant agents exhibit various solubilities in water and alcohol (ethanol). For example, 1 volume of cinnamon oil dissolves in 2 volumes of 70 percent alcohol, 1 volume of peppermint oil dissolves in 3 volumes of 70 percent alcohol and 1 volume of spearmint oil dissolves in 1 volume of 80 percent alcohol. *The National Formulary XVI*, United States Pharmacopeial Convention, Inc., Rockville, Md., 1985. Oil of wintergreen is miscible in alcohol and slightly soluble in water. *The Merck Index*, Tenth Edition, Merck & Co., Rahway, N.J.

The weight ratio of the liquid flavorant agent to the PVAC is about 1:5 to about 5:1, preferably about 1:2 to about 2:1, respectively.

A cross-linking agent or a continuous gum arabic or gelatin film is not needed, even when a flavorant agent that is a good solvent for PVAC is utilized. Thus, a composition of the invention is typically free from cross-linking agents, gum arabic or gelatin film.

Optionally, the flavorant release composition comprises a sweetening agent that can be homogeneously dispersed throughout the flavorant release composition and that will be released over an extended period of time during mastication. This optional sweetening agent can be a natural or synthetic sweetener and is present in a sweetening effective amount. This sweetening effective amount is preferably between about 0.001 and about 10 weight percent, more preferably between about 0.001 and about 0.1 weight percent, of the flavorant release composition.

Illustrative optional sweetening agents include aspartame, dextrates, dextrose, dextrose excipient, fructose, mannitol, saccharin, saccharin calcium, saccharin sodium, sorbitol, sorbitol solution, sugar, syrup and the like. The sweetening agent can be used singly or in conjunction with another sweetening agent.

This invention also contemplates the use of two or more flavorant release compositions in a single chewable structure. Yet, when two or more flavorant release compositions are used, each should be a continuous film, i.e., in its own continuous phase. The compositions cannot be intermixed in the final structure, nor be in disperse or discontinuous phases. The weight ratio of the gum base composition to the total weight of all flavorant release compositions utilized in the chewable structure is about 20:1 to about 4:1, preferably about 10:1 to about 5:1, respectively. That is, even when more than one flavorant release composition is utilized, as discussed in detail hereinbelow, the sum of the weight of all of these flavorant release compositions is utilized in determining the above weight ratio.

A method of producing the sustained flavorant release composition of the present invention comprises the steps of admixing PVAC dissolved in a volatile, nonreactive organic solvent, such as provided hereinafter, with a liquid flavorant agent to produce a homogenous dispersion. The solvent is then removed from the homogenous dispersion to produce a continuous film of the flavorant release composition. The weight ratio of the liquid flavorant agent to the PVAC is discussed hereinabove.

It is not known if the admixing of PVAC and organic solvent produces a true solution, an emulsion, colloidal suspension or a dispersion. To the naked eye, however, this admixture appears to be, and behaves like, a solution, and is thus referred to herein as a solution.

The admixing is carried out at a temperature at which there is substantially no degradation of the flavorant agent, there is minimal evaporative loss of volatile compounds and at which the admixture is deformable. Furthermore, the homogenous dispersion can be substantially free of a separate plasticizing agent that is distinct from the liquid flavorant agent.

A further, more detailed, illustrative method of producing the sustained flavorant release composition of the present invention comprises the following steps: (1) dissolving the PVAC in a volatile, nonreactive organic solvent at a temperature greater than about 20 degrees C. and below the boiling point of the solvent to form a solution; (2) admixing the solution with the liquid flavorant agent at an elevated temperature to obtain a homogenous dispersion; (3) cooling the homogenous dispersion, and (4) removing the solvent from the homogenous dispersion to produce a continuous film of the flavorant release composition. The solution and homogenous dispersion exhibit a deformable viscosity at the temperature of their individual formulations.

Suitable volatile, nonreactive organic solvents include solvents that have boiling points, under atmospheric pressure, at a temperature preferably less than about 250 degrees C., more preferably less than about 100 degrees C. The temperature of the boiling point is preferably greater than the admixing temperature which is discussed hereinbelow.

The nonreactive solvent is nonreactive with the sustained flavorant release composition and constituents thereof, e.g., the PVAC, the flavorant agent and the sweetening agent. The term "nonreactive", as used herein in its various grammatical forms, indicates that the solvent does not make or break chemical bonds, except possibly hydrogen bonds, and may solvate protons.

Illustrative volatile, nonreactive organic solvents include ethanol, chloroform, methanol, trichloroethylene, ethylene dichloride, acetone, ethyl acetate, butylene glycol, the like and mixtures thereof. A mixture of ethyl acetate and ethanol is presently preferred. The volume ratio of ethyl acetate to ethanol is preferably about 10:1 to about 1:1, more preferably about 2:1 to about 4:1.

The percent weight (grams) of the PVAC to the volume (milliliters) of the solvent is about 1 to about 20 percent, and more preferably about 5 to about 20 percent.

The temperature at which the dissolving step is usually performed is preferably about 50 to about 90 degrees C., more preferably about 60 to about 80 degrees C.

The time period for the dissolving step is a time period sufficient for complete dissolution of the PVAC. This time is dependent upon the temperature at which the dissolving step is performed and the solvent utilized, as well as the concentration of the PVAC in the solvent.

In the admixing step, the solution and the liquid flavorant agent are admixed at a temperature at which there is substantially no degradation of the flavorant agent, there is minimal evaporative loss of volatile compounds and at which the admixture is deformable. The admixing temperature is typically lower than the temperature at which the solution is formed. Furthermore, the admixing temperature is typically greater than about 20 degrees C. and less than that of the boiling point of the solvent, as well as below the temperature at which the flavorant agent boils or degrades. Preferably, this admixing temperature is about 20 to about 140 degrees C., more preferably about 40 to about 60 degrees C.

The term "degradation", in its various grammatical forms, means chemical breakdown of the liquid flavorant agent, resulting in reduction of the amount of flavorant agent available for release from the flavorant release composition upon mastication.

Admixing is continued for a time period sufficient to obtain a homogenous dispersion. This time period is dependent upon several facts including the solvent utilized, the amount of solvent utilized, the temperature at which the admixing step is carried out and the like. Typical admixing time periods for this step are about 10 minutes to about 24 hours.

The above-described optional sweetening agent may be present in the sustained flavorant release composition, as previously discussed. The sweetening agent can be admixed with the solution prior to, or with, the flavorant agent or with the homogeneous dispersion.

Admixing of the sweetening agent with the solution or homogeneous dispersion is for a time period effective to produce a homogeneous dispersion. If the sweetening agent is admixed with the flavorant agent-containing homogeneous dispersion, admixing continues for a time period effective to produce a second homogeneous dispersion.

The resulting homogenous dispersion (either with or without the optional sweetening agent) can then be cast, extruded or otherwise formed into the desired shape of the flavor release composition e.g., element 12 of FIG. 1. The shape formed must be a continuous one, that is, in the final chewable structure the element 12 remains a continuous phase and is not broken up within another phase, e.g., dispersed in the gum base composition phase. Formation can be performed before or after removal of the solvent. Furthermore, formation can be performed before or after the resulting homogeneous dispersion is cooled.

Preferably, cooling is performed at a rate that prevents premature crystallization (opacity) of the dispersion, i.e., crystallization of the polymer while observable, liquid solvent is present. Such crystallization forms a non-homogenous flavor releasing element. It is presently believed that premature crystallization adversely effects flavor release. In the cooling step, the homogenous dispersion is cooled to about ambient temperature, i.e., a temperature of about 20 to about 30 degrees C.

The viscosity of the homogenous dispersion, with or without the optional sweetening agent, is about 1 to about 1500, preferably about 1 to about 500 centipoise (cp), at the admixing temperature discussed hereinabove, and about 1 to about 7000, preferably about 1 to about 1000 cp at ambient temperature.

In the solvent removing step, the solvent is removed at a temperature at which there is substantially no degradation of the flavoring agent (and, if used, of the optional sweetening agent). Furthermore, the solvent is removed at a relatively slow rate, sufficient to inhibit premature crystallization of the dispersion. The sustained flavorant release composition is thereby produced.

Solvent removal is preferably performed under approximately ambient conditions of a temperature of about 20 to about 30 degrees C. and a pressure of about one atmosphere. The time period required depends upon the thickness of the cast or otherwise formed homogenous dispersion. Typically this time period is about 30 to about 480 minutes per millimeter of casting thickness.

Alternatively, solvent removal can be performed at a reduced pressure, provided that volatile components of the flavorant agent are not also removed.

The residual solvent concentration, if any, in the sustained flavorant release composition is within acceptable concentration levels deemed as acceptable by the FDA for the solvent utilized. Furthermore, the residual solvent should not adversely affect flavor or flavor release.

A typical flavorant release composition, in sheet form, preferably has a thickness of about 10 to about 150 mils, more preferably about 15 to about 125 mils.

The flavorant release composition is then juxtaposed with the gum base composition. The juxtaposition should occur such that the flavorant release composition remains continuous, that is that there are two separate and continuous phases—the gum base composition and the continuous film. The film cannot be dispersed in granular form within the separate phase of the gum base composition. Exemplary means for juxtaposition include lamination, coating and the like.

In an alternate production method, the solvent is removed after the flavorant release composition and the gum base composition have been juxtaposed as desired. Specifically, the flavorant release composition is applied as the homogenous dispersion, described above, to the gum base composition (element 14 of FIG. 1). Then, the solvent is removed to produce the structure 10 in which the flavorant release composition (element 12) is juxtaposed with the gum base composition (element 14).

Illustrative sustained flavorant release compositions were prepared in accordance with the following EXAMPLES 1, 2 and 3.

EXAMPLE 1

Preparation of Sustained Flavorant Release Composition

In a suitable vessel, 3.0 grams (gm) of polyvinyl acetate (PVAC) having a number average molecular weight of about 167,000 daltons (PVAC, high molecular weight, commercially available from Aldrich Chemical Co., Milwaukee, Wis.) were dissolved in 50 milliliters (ml) of an organic solvent which was an admixture of 35 ml of ethyl acetate and 15 ml of ethanol. The temperature was about 70 degrees C. and the time period for dissolving was about 30 to 60 minutes.

The temperature of the solution was reduced to about 50 degrees C. prior to introducing 3.0 ml of the liquid flavorant agent, peppermint oil. This temperature was maintained for the duration of the mixing time which was about 15 minutes. A homogenous dispersion was obtained.

The homogenous dispersion was removed from the heat source and cooled to a temperature of about 25 degrees C. over a time period of about 5 to 10 minutes.

The cooled homogenous dispersion was then poured into a suitable flat, open container.

The solvent was then evaporated from the homogenous dispersion under ambient conditions, and over a time period of 48 hours. The sustained flavorant release composition in film shape and having a thickness of about 20 mils was recovered and utilized in the preparation of the chewable structure as described below.

EXAMPLE 2

Preparation of Sustained Flavorant Release Composition

A flavorant release composition was prepared as in EXAMPLE 1, however the molecular weight of the polyvinyl acetate was 113,000 Daltons.

EXAMPLE 3

Preparation of Sustained Flavorant Release Composition

A flavorant release composition was prepared as in EXAMPLE 1, however, the molecular weight of the polyvinyl acetate was 83,000 Daltons.

Chewable structures were prepared as described below utilizing the sustained flavorant release compositions of EXAMPLES 1, 2 and 3. EXAMPLE 4 is illustrative of the preparation of such chewable structures.

EXAMPLE 4

Preparation of Chewable Structures

The flavorant release composition films of EXAMPLES 1, 2 and 3 were cut into the desired size and then conventionally wrapped around a commercially available gum base composition available from Warner-Lambert under the trade designation TRIDENT ® to produce the chewable structures. The quantity, e.g., weight, of flavorant release composition film and of the gum base composition, as well as the wrapping arrangement, were selected such that the weight ratio of gum base composition to sustained flavorant release composition was within the afore-discussed range.

The resulting chewable structures prepared in accordance with the above examples exhibited flavorant agent release or combined flavorant agent and sweetening agent release for a time period of about 360 minutes. That time of flavor release was typical for similarly prepared chewable structures and illustrates the great advance of a chewable structure of the present invention over the chewing gum art.

Figure 2:
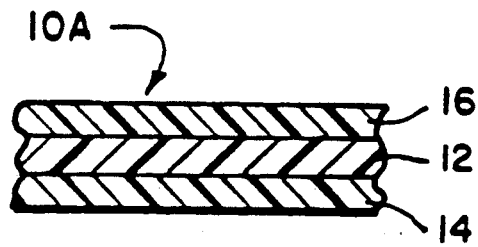
FIG. 2 is a greatly enlarged, fragmentary, longitudinal cross-sectional view of a second chewable structure embodying the present invention that includes two continuous films of sustained flavor release compositions and a gum base composition.

Various shapes and configurations of the chewable structure can be obtained by varying the spatial relationship of the flavor release composition and the gum base composition and the shape of each. Thus, the chewable structure is not limited to the single or double layer planar configurations as shown in FIG. 1 or FIG. 2. The only limitation on the shape is that the flavor release composition remains a continuous film, that is, in its own continuous phase and does not constitute a disperse phase in the gum base composition or in another element.

A three element chewable structure 10A of the present invention is shown in FIG. 2. The chewable structure 10A includes a first continuous film of sustained flavorant release composition designated as element 12, a gum base composition designated as element 14 and a second continuous film of sustained flavorant release composition designated as element 16. The second film shown as element 16 is applied to the element 12 by known means. Alternatively, the second film (element 16) can be applied to the element 12 as a homogenous dispersion (as discussed previously with reference to the method for producing the chewable structure shown in FIG. 1).

It is understood that the relative positions of the elements 12, 14, and 16 are interchangeable in the chewable structure 10A, so long as each element remains in a continuous phase. Thus, for example, element 14 (gum base composition) can be positioned between the elements 12 and 16 (the two flavorant release compositions).

Element 12 may be produced from a first flavorant release composition, and element 16 may be produced from a second flavorant release composition. The two flavorant release compositions can be identical to, or different from, each other. Thus, different flavorant agents can be released.

Also, the rate of release of each of the flavorant agents be identical to, or different from, each other. Different rates of release may be obtained by varying the amount of the PVAC utilized in the respective flavorant release composition. By varying these above parameters, the sensation of flavor can be changed with time.

The weight ratio of the gum base composition to total weight of the two sustained flavorant release compositions used in the chewable structure is preferably about 20:1 to about 4:1, more preferably about 10:1 to about 5:1, respectively. This is in accordance with the afore-discussed requirement that the sum of the weights of all of the flavorant release compositions utilized in the chewable structure be employed when calculating this weight ratio.

Figure 3:
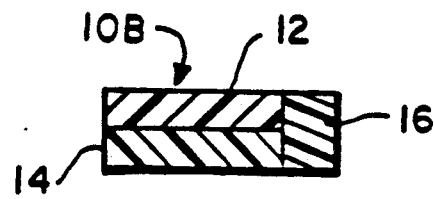
FIG. 3 is a greatly enlarged, traverse, cross-sectional view of a third chewable structure embodying the present invention that includes a second continuous film of sustained flavor release composition juxtaposed along the longitudinal edges of a first continuous film of sustained flavor release composition and a gum base composition.

Another three element chewable structure 10B of the present invention is shown in FIG. 3. The chewable structure 10B includes a first continuous film of sustained flavorant release composition, designated element 12, a gum base composition, designated element 14, and a second continuous film of sustained flavor release composition, designated as element 16 juxtaposed along the longitudinal edges of element 12 and element 14. It is understood that the relative positions of the elements 12, 14 and 16 are interchangeable in the chewable structure 10B.

Figure 4:
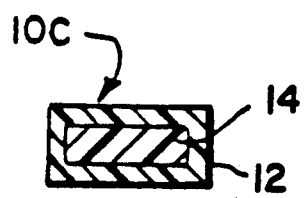
FIG. 4 is a greatly enlarged, transverse, cross-sectional view of a fourth chewable structure embodying the present invention in which a rectangular section of a gum base composition is enveloped in a continuous film of sustained flavor release composition.

A rectangular cross section of a chewable structure 10C of the present invention is shown in FIG. 4. The chewable structure 10C includes a continuous film of sustained flavorant release composition, designated as element 12, enveloping a gum base composition, designated as element 14.

The term "envelop", as used herein in its various grammatical forms, defines the macroscopic relationship of the elements wherein one element enfolds the other element either partially or completely.

It will be appreciated that the relative positions of the elements 12 and 14 are interchangeable in the chewable structure 10C. Thus, the gum base composition, element 14, can envelop the continuous film of sustained flavorant release composition, element 12. Furthermore, the chewable structure 10C can include another continuous film of a sustained flavor release composition. These further alternatives are not illustrated. Note, it is important that each element remains in a distinct continuous phase. For proper functioning of the present invention, no disperse phases can exist.

Figure 5:
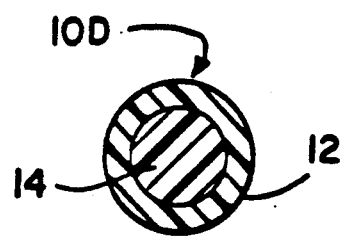
FIG. 5 is an enlarged, transverse, cross-sectional view of a fifth chewable structure embodying the present invention, in which a circular section of a gum base composition is enveloped in an annulus shaped continuous film of sustained flavor release composition.

A cross-sectional view of a chewable structure 10D of the present invention is shown in FIG. 5. The chewable structure 10D includes a gum base composition, designated as element 14, having a circular transverse cross section. Thus, the gum base composition can have a shape that is spherical or cylindrical. This gum base composition, element 14, is enveloped by the continuous film of sustained flavorant release composition, element 12.

The relative positions of the elements 12 and 14 are interchangeable in the chewable structure 10D, so long as each is in a distinct continuous phase. Thus, element 14 (gum base) can envelop element 12 (continuous film). Furthermore, the chewable structure can include a second continuous film of sustained flavorant release composition. These further alternatives are not illustrated.

This invention has been described in terms of specific embodiments set forth in detail. It should be understood, however, that these embodiments are by way of illustration only, and that the invention is not necessarily limited thereto. Modifications and variations will be apparent from this disclosure and may be resorted to without departing from spirit of this invention, as those skilled in the art will appreciate. Accordingly, such variations and modifications of the disclosed invention are considered to be within the purview and scope of this invention.

We claim:

1. A sustained flavorant release composition suitable for providing sustained release of a flavorant from a chewable structure comprising a continuous film of a homogenous dispersion of a liquid flavorant agent and polyvinyl acetate, the weight ratio of said liquid flavorant agent to said polyvinyl acetate being about 1:5 to about 5:1, respectively.

2. The composition of claim 1, wherein said weight ratio of said liquid flavorant agent to said polyvinyl acetate is about 1:2 to about 2:1, respectively.

3. The composition of claim 1, wherein said polyvinyl acetate has a number average molecular weight of at least about 2,000 daltons.

4. The composition of claim 3, wherein the number average molecular weight of the polyvinyl acetate is between about 2000 and 200,000 daltons.

5. The composition of claim 3, wherein the number average molecular weight of the polyvinyl acetate is between about 80,000 and 200,000 daltons.

6. The composition of claim 1, further comprising a sweetening agent present in a sweetening effective amount.

7. The composition of claim 6, wherein said sweetening effective amount is between about 0.001 and 0.1 weight percent of said flavorant release composition.

8. A method of producing a sustained flavorant release composition, suitable for providing sustained release of a flavorant from a chewable structure comprising the steps of:

(a) producing an admixture of polyvinyl acetate dissolved in a volatile, nonreactive organic solvent and a liquid flavorant agent such that a homogeneous dispersion is obtained, the weight ratio of said liquid flavorant agent to said polyvinyl acetate being about 1:5 to about 5:1, respectively, said admixing being carried out at a temperature at which there is substantially no degradation of said flavorant agent and at which said admixture is deformable; and (b) removing said solvent at a temperature at which there is substantially no degradation and minimal evaporative loss of said flavorant agent such that a continuous film of said sustained flavorant release composition is produced.

9. A method of producing a sustained flavorant release composition suitable for providing sustained release of a flavorant from a chewable structure, comprising the steps of:

(a) dissolving polyvinyl acetate in a volatile, nonreactive organic solvent such that a solution having a deformable viscosity at the temperature of said solution is produced;

(b) admixing with the solution of step (a) a liquid flavorant agent, such that an admixture is obtained that is a homogenous dispersion, the weight ratio of said liquid flavorant agent to said polyvinyl acetate being about 1:5 to about 5:1, respectively, said admixing being carried out at a temperature at which there is substantially no degradation of said flavorant agent and at which said admixture is deformable; and (c) removing said solvent at a temperature at which there is substantially no degradation and minimal evaporative loss of said flavorant agent, such that a continuous film of said sustained flavorant release composition is obtained.

10. The method of claim 9, wherein said polyvinyl acetate has a number average molecular weight of at least 2,000 daltons.

11. The method of claim 10, wherein said polyvinyl acetate has a number average molecular weight of between about 2000 and 500,000 daltons.

12. The method of claim 10, wherein said polyvinyl acetate has a number average molecular weight of between about 80,000 and 200,000 daltons.

13. The method of claim 9, wherein said weight ratio of liquid flavoring agent to said polyvinyl acetate is about 1:2 to about 2:1, respectively.

14. The method of claim 9, wherein said temperature during said dissolving of said polyvinyl acetate is about 50 to about 90 degrees C.

15. The method of claim 9, further comprising the step, performed before step (c), of admixing with the homogenous dispersion a sweetening agent in a sweetening effective amount to produce a second homogenous dispersion.

16. The method of claim 15, wherein the sweetening effective amount is between about 0.001 and 0.1 weight percent of said composition.

17. A method of producing a sustained flavorant release composition suitable for providing sustained release of a flavorant from a chewable structure comprising the steps of:

(a) dissolving polyvinyl acetate in a volatile, nonreactive organic solvent at a temperature of about 50 to about 90 degrees C., such that a solution is produced;

(b) admixing with said solution a liquid flavorant agent at a temperature of about 40 to about 60 degrees C., such that a homogenous dispersion is obtained, the weight ratio of said flavorant agent to said polyvinyl acetate being about 1:2 to about 2:1; and (c) removing said solvent at a temperature at which there is substantially no degradation and minimal evaporative loss of said flavorant agent, such that a continuous film of said sustained flavorant release composition is produced.

18. A chewable structure comprising:

(a) a continuous film of sustained flavorant release composition comprising a homogenous dispersion of a liquid flavorant agent and polyvinyl acetate, the weight ratio of said liquid flavorant agent to said polyvinyl acetate being about 1:5 to about 5:1, respectively, and (b) a gum base composition juxtaposed with said sustained flavorant release composition, such that the sustained flavorant release composition phase and the gum base composition phase are each discrete and continuous, the weight ratio of said gum base composition to the total weight of said sustained flavorant release composition being about 20:1 to about 4:1, respectively.

19. The chewable structure of claim 18, wherein said polyvinyl acetate has a number average molecular weight of at least about 2,000 daltons.

20. The chewable structure of claim 19, wherein said polyvinyl acetate has a number average molecular weight of between about 2000 and 500,000 daltons.

21. The chewable structure of claim 19, wherein said polyvinyl acetate polyvinyl acetate has a number average molecular weight of between about 80,000 and 200,000 daltons.

22. The chewable structure of claim 18, wherein said weight ratio of said liquid flavorant agent to said polyvinyl acetate is about 1:2 to about 2:1, respectively.

23. The chewable structure of claim 18, further comprising:

a second continuous film of sustained flavorant release composition, such that each of said continuous film, second continuous film and gum base composition is distinct and continuous, said second sustained flavor release composition comprising a homogenous dispersion of a second liquid flavorant agent and a second polyvinyl acetate, the weight ratio of said second liquid flavorant agent to said second polyvinyl acetate being about 1:5 to about 5:1, respectively.

24. The chewable structure of claim 23, wherein the first and second sustained flavorant release compositions are identical.

25. The chewable structure of claim 18, wherein the weight ratio of liquid flavorant to polyvinyl acetate is about 1:2 to about 2:1, respectively.

26. The chewable structure of claim 18, wherein the weight ratio of the gum base composition to the sustained flavorant release composition is about 10:1 to about 5:1, respectively.

27. The chewable structure according to claim 18, wherein the weight ratio of liquid flavorant to polyvinyl acetate is about 1:2 to about 2:1, respectively and the weight ratio of the gum base composition to the sustained flavorant release composition is about 10:1 to about 5:1, respectively.

28. The chewable structure of claim 18, wherein said sustained flavorant release composition further comprises a sweetening agent in an effective sweetening amount.

29. A chewable structure of claim 28, wherein said sweetening effective amount is between about 0.001 and 0.1 weight percent of said flavorant release composition.

30. The chewable structure of claim 27, wherein said continuous film of sustained flavorant release composition envelops said gum base composition.

31. The chewable structure of claim 30, wherein said sustained flavorant release composition further comprises a sweetening agent in an effective sweetening amount.

32. The chewable structure of claim 31, wherein the sweetening effective amount is between about 0.001 and 0.1 weight percent of said flavorant release composition.

33. The chewable structure of claim 27, wherein said gum base composition envelops said continuous film of sustained flavorant release composition.

34. The chewable structure of claim 33, wherein said sustained flavorant release composition further comprises a sweetening agent in an effective sweetening amount.

35. The chewable structure of claim 34, wherein the sweetening effective amount is between about 0.001 and 0.1 weight percent of said flavorant release composition.

36. A sustained flavorant release composition suitable for providing sustained release of a flavorant from a chewable structure comprising a plurality of continuous phases, each of said phases comprising a continuous film of a homogeneous dispersion of a liquid flavorant agent and polyvinyl acetate, the weight ratio of said liquid flavorant agent to said polyvinyl acetate being about 1:5 to about 5:1, respectively.

37. The composition of claim 36, wherein said weight ratio of said liquid flavorant agent to said polyvinyl acetate is about 1:2 to about 2:1, respectively.

38. The composition of claim 36, wherein said polyvinyl acetate has a number average molecular weight of at least 2,000 daltons.

39. The composition of claim 38, wherein the average molecular weight of the polyvinyl acetate is between about 80,000 and 200,000 daltons.

40. The composition of claim 36, further comprising a sweetening agent present in a sweetening effective amount.

41. The composition of claim 40, wherein said sweetening effective amount is between 0.001 and 0.1 weight percent of said flavorant release composition.

42. The composition of claim 36, further comprising a gum base composition present as a distinct continuous phase, the weight ratio of said gum base composition to the total weight of said sustained flavorant release composition being about 20:1 to about 4:1, respectively.

* * * * *